(12) United States Patent
Chin et al.

(10) Patent No.: US 9,247,423 B2
(45) Date of Patent: Jan. 26, 2016

(54) SYSTEM AND METHOD FOR PROTECTING PRIVATE INFORMATION BY USING NFC TAGS

(71) Applicant: Samsung Electronics Co., Ltd., Suwon-si (KR)

(72) Inventors: Woo-seok Chin, Hwaseong-si (KR); Jin Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 113 days.

(21) Appl. No.: 14/069,426

(22) Filed: Nov. 1, 2013

(65) Prior Publication Data

US 2014/0120877 A1 May 1, 2014

(30) Foreign Application Priority Data

Nov. 1, 2012 (KR) .................. 10-2012-0123101

(51) Int. Cl.
*H03M 1/66* (2006.01)
*H04W 12/02* (2009.01)
*H04M 1/663* (2006.01)
*H04M 1/725* (2006.01)
*H04W 4/00* (2009.01)
*H04M 1/2745* (2006.01)
(Continued)

(52) U.S. Cl.
CPC .............. *H04W 12/02* (2013.01); *H04M 1/663* (2013.01); *H04L 63/0407* (2013.01); *H04L 63/107* (2013.01); *H04L 63/108* (2013.01); *H04M 1/274516* (2013.01); *H04M 1/7253* (2013.01); *H04M 1/72577* (2013.01); *H04M 2250/04* (2013.01); *H04W 4/008* (2013.01); *H04W 4/021* (2013.01)

(58) Field of Classification Search
CPC ..... H04W 12/02; H04W 4/021; H04W 4/008; H04M 1/663; H04M 1/274516; H04M 1/7253; H04M 2250/04; H04M 1/72577; H04L 63/108; H04L 63/107; H04L 63/0407
See application file for complete search history.

(56) References Cited

U.S. PATENT DOCUMENTS

| 2006/0094411 | A1 | 5/2006 | Dupont |
| 2006/0160523 | A1* | 7/2006 | Erskine et al. ................ 455/405 |
| 2008/0080691 | A1* | 4/2008 | Dolan et al. ............. 379/201.01 |

(Continued)

FOREIGN PATENT DOCUMENTS

| EP | 1761093 A1 | 3/2007 |
| KR | 1020090010246 A | 1/2009 |

(Continued)

OTHER PUBLICATIONS

Communication dated Mar. 17, 2014, issued by the European Patent Office in counterpart European Application No. 13190548.1.

*Primary Examiner* — Martin Mushambo
(74) *Attorney, Agent, or Firm* — Sughrue Mion, PLLC

(57) ABSTRACT

A system and method for protecting private information by using a near field communication (NFC) tag is provided. A method of making a call by using a telephone number received from a near field communication (NFC) tag in a device includes: receiving from the NFC tag a telephone number and call limit information related to the telephone number according to an approach to the NFC tag; determining whether a call to a target device having the received telephone number is limited based on the call limit information; and limiting a call to the target device based on the determination.

33 Claims, 11 Drawing Sheets

(51) Int. Cl.
*H04W 4/02* (2009.01)
*H04L 29/06* (2006.01)

(56) References Cited

U.S. PATENT DOCUMENTS

2008/0256215 A1   10/2008   Chang
2009/0305686 A1*  12/2009   Morota et al. ............... 455/418
2010/0078475 A1   4/2010    Lin et al.
2010/0216510 A1   8/2010    Wang
2010/0317371 A1   12/2010   Westerinen et al.
2012/0094598 A1*  4/2012    Tysowski .................... 455/41.1

FOREIGN PATENT DOCUMENTS

KR   1020100128894 A   12/2010
WO   2011/033365 A2    3/2011

* cited by examiner

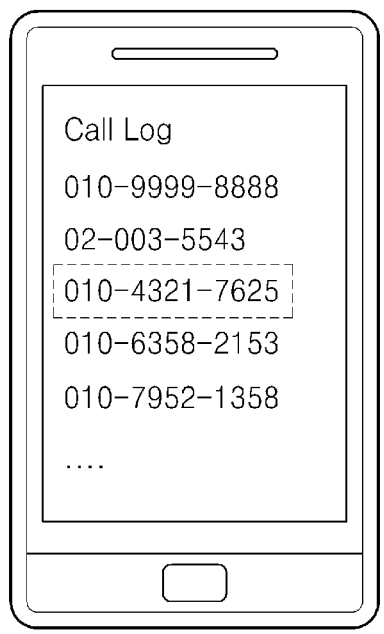 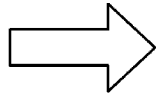 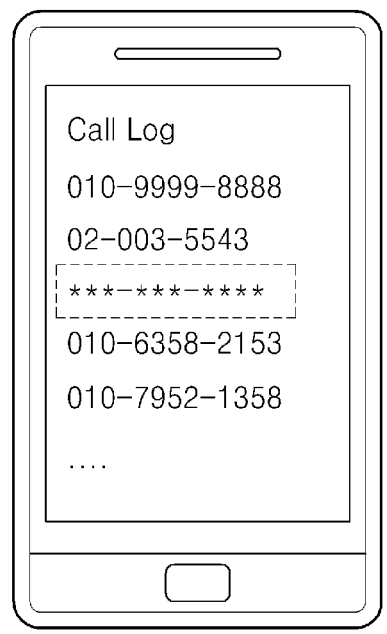
FIG.6A    FIG.6B

SYSTEM AND METHOD FOR PROTECTING PRIVATE INFORMATION BY USING NFC TAGS

RELATED APPLICATIONS

This application claims the benefit of Korean Patent Application No. 10-2012-0123101, filed on Nov. 1, 2012, in the Korean Intellectual Property Office, the disclosure of which is incorporated herein by reference, in its entirety.

BACKGROUND

1. Field

One or more exemplary embodiments relate to a system and method of protecting private information by using a near field communication (NFC) tag, whereby the private information can be protected according to a call limit condition.

2. Description of the Related Art

A user, such as a vehicle owner, a building owner or the like, frequently makes available a telephone number including private information thereof to strangers through a memo. For example, the vehicle owner leaves a memo including a telephone number thereof on a dashboard of a vehicle so that a stranger can easily contact the vehicle owner.

However, in this case, there is a problem that the telephone number of the user is exposed to many unspecified people. In addition, the telephone number left by the user for an emergency contact may be abused, resulting in a prank call, an advertisement call, or other crimes.

Thus, a technique of minimizing the exposure of a telephone number of a user to strangers and effectively limiting indiscriminate calls to the telephone number of the user is required.

SUMMARY

One or more exemplary embodiments include a system and method for protecting private information by using a near field communication (NFC) tag, whereby a call to a telephone number received from the NFC tag can be limited by using call limit information received from the NFC tag.

One or more exemplary embodiments include a system and method for protecting private information by using an NFC tag, whereby the private information can be protected by using a random number value generated by a target device.

Additional aspects will be set forth in part in the description which follows and, in part, will be apparent from the description, or may be learned by practice of the exemplary embodiments.

According to one or more exemplary embodiments, a method of making a call by using a telephone number received from a near field communication (NFC) tag in a device which includes: receiving a telephone number and call limit information related to the telephone number from the NFC tag according to an approach to the NFC tag; determining whether a call to a target device having the received telephone number is limited, based on the call limit information; and limiting a call to the target device based on the determination.

The call limit information may include information related to a time condition for a call to the target device, and the determining may include determining whether a call to the target device is limited, based on whether a predetermined time has elapsed from a time the device approached the NFC tag.

The call limit information may include information related to a position condition for a call to the target device. The method may further include checking a position of the device according to the approach to the NFC tag, and the determining may include determining whether a call to the target device is limited, based on the information related to the position condition and the checked position of the device.

The call limit information may include information related to a count condition for a call to the target device.

The method may further include checking the number of times the device was call-connected to the target device, and the determining may include determining whether a call to the target device is limited, based on the information related to the count condition and the checked number of times.

The limiting may include blocking transmission of a call connection signal from the device to the telephone number.

The limiting may include deleting the telephone number from a call log.

The method may further include transmitting a call connection signal to the target device if a call to the target device is not limited.

The method may further include receiving a random number value from the NFC tag according to the approach to the NFC tag, wherein the transmitting includes transmitting to a server a value obtained by computing the telephone number and the random number value.

The random number value may be generated by the target device and provided to the NFC tag and the server.

The random number value may be updated by the target device, and the updated random number value may be provided from the target device to the NFC tag and the server.

The method may further include receiving a predetermined identification value which corresponds to the telephone number according to the approach of the device to the NFC tag, wherein the transmitting includes transmitting the identification value to the server, and the telephone number is confirmed by the server based on the computed value and the identification value.

According to one or more exemplary embodiments, a portable terminal device includes: a memory configured to store at least one program; and a processor configured to make a call using a telephone number received from a near field communication (NFC) tag by executing the at least one program, wherein the at least one program includes instructions configured to execute: receiving from the NFC tag according to an approach to the NFC tag the telephone number and call limit information related to the telephone number; determining, based on the call limit information, whether a call to a target device having the received telephone number is limited; and limiting a call to the target device based on the determination.

The call limit information may include information related to a time condition for a call to the target device, and the determining may include determining whether a call to the target device is limited, based on whether a predetermined time has elapsed from a time the portable terminal device approached the NFC tag.

The call limit information may include information related to a position condition for a call to the target device; the at least one program may further include instructions for executing the checking of a position of the portable terminal device according to the approach to the NFC tag, and the determining may include determining whether a call to the target device is limited, based on the information on the position condition and the checked position of the portable terminal device.

The call limit information may include information related to a count condition for a call to the target device, the at least one program may be further configured to include instructions for executing checking the number of times the portable terminal device was call-connected to the target device, and the determining may include determining whether a call to the target device is limited, based on the information on the count condition and the checked number of times.

The limiting may include blocking transmission of a call connection signal from the portable terminal device to the target device.

The limiting may include deleting the telephone number from a call log.

The at least one program may be further configured to include instructions for executing transmitting a call connection signal to the target device in response to a call to the target device not being limited.

The at least one program may further include instructions for executing the receiving of a random number value from the NFC tag according to the approach to the NFC tag, wherein the transmitting includes transmitting to a server a value obtained by computing the telephone number and the random number value.

The random number value may be generated by the target device and provided to the NFC tag and the server.

The random number value may be updated by the target device, and the updated random number value may be provided from the target device to the NFC tag through the server.

The at least one program may further include instructions configured to execute the receiving of a predetermined identification value which corresponds to the telephone number according to the approach of the portable terminal device to the NFC tag, wherein the transmitting includes transmitting the identification value to the server, and the telephone number is confirmed by the server based on the computed value and the identification value.

According to one or more exemplary embodiments, a non-transitory computer-readable storage medium has stored therein program instructions, which when executed by a processor of a computer, cause the computer to perform the disclosed method.

An aspect of an exemplary embodiment may further provide a system for making a call by using a telephone number and call limiting information received from a near field communication (NFC) tag, the system including: a device configured to be in communication with the NFC tag; and a target device configured to provide the NFC tag with the telephone number and call limit information related to the target device; wherein, in response to the device coming in communication with the NFC tag, the device is configured to receive the telephone number and call limit information and determine whether a call to the target device is limited.

The system for making a call by using a telephone number received from a near field communication (NFC) tag may further include a server located between the device and the target device.

The device may limit a call to the target device based on the determination that the call is limited. The call limit information may include a current time. In addition, the call limit information may include whether the device is within a preset range of the NFC tag.

The server may be configured to receive a random number value from the NFC tag according to an approach to the NFC tag by the device and the target device may transmit the random number to the NFC tag. Additionally, the target device may update the random number.

BRIEF DESCRIPTION OF THE DRAWINGS

These and/or other aspects will become apparent and more readily appreciated from the following description of the exemplary embodiments, taken in conjunction with the accompanying drawings in which:

FIGS. 6A and 6B illustrate the limiting of a call from the device to the target device, according to an exemplary embodiment;

DETAILED DESCRIPTION OF THE EXEMPLARY EMBODIMENTS

Figure 1:
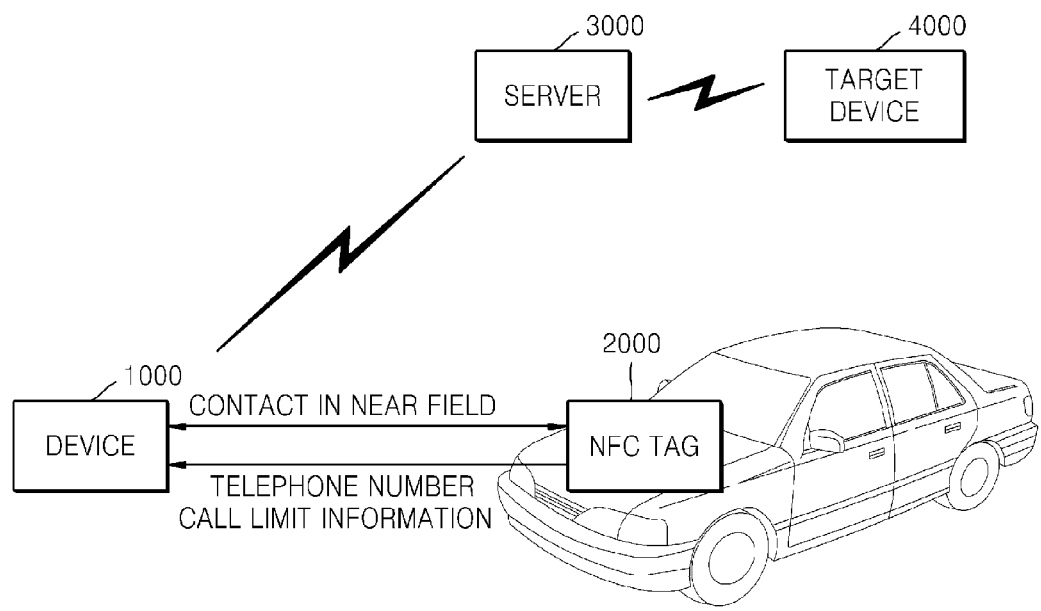
FIG. 1 is a block diagram of a system for protecting private information by using a near field communication (NFC) tag, according to an exemplary embodiment.

Hereinafter, exemplary embodiments will be described in detail with reference to the accompanying drawings so that one of ordinary skill in the art may easily comprehend the exemplary embodiments. However, the exemplary embodiments may be embodied in many different forms and should not be construed as being limited to the exemplary embodiments set forth herein. In the drawings, parts irrelevant to the description are omitted to clearly describe the exemplary embodiments, and like reference numerals denote like elements throughout the specification.

When a certain component is described throughout the specification as being "connected" to another component, the certain component may be "directly connected" to another component or may be "electrically connected" to another component with a third component interposed therebetween. In addition, when a certain part "includes" a certain component, this indicates that the part may further include another component instead of excluding another component unless there is a different disclosure.

As used herein, expressions such as "at least one of," when preceding a list of elements, modify the entire list of elements and do not modify the individual elements of the list.

Hereinafter, the exemplary embodiments are described in detail with reference to the accompanying drawings.

FIG. 1 is a block diagram of a system for protecting private information by using a near field communication (NFC) tag 2000, according to an exemplary embodiment.

As shown in FIG. 1, the system may include a device 1000, the NFC tag 2000, a server 3000, and a target device 4000.

The device 1000 may receive a telephone number of the target device 4000 and call limit information, which are stored in the NFC tag 2000, according to an approach to the NFC tag 2000. In addition, the device 1000 may determine whether a call to the target device 4000 having the received telephone number is limited, based on the received call limit information. In this case, a user of the target device 4000 may record in advance a telephone number of the user in the NFC tag 2000.

In addition, the device 1000 may check call conditions related to a position of the device 1000, a call time, and the number of calls with the target device 4000 based on the call limit information and may determine, based on the checked call conditions, whether a call from the device 1000 to the target device 4000 is limited.

The server 3000 may connect the device 1000 and the target device 4000 so that a call is made between the device 1000 and the target device 4000.

Each of the device 1000 and the target device 4000 may be a smart phone, a cellular phone, a personal digital assistant (PDA), a laptop computer, a media player, a global positioning system (GPS) device, and another mobile or non-mobile computing device, but is not limited thereto. The server 3000 may be a call server of a communication provider, but is also not limited thereto.

The NFC tag 2000 may be located at a place where private information of a user needs to be provided to another user. For example, the NFC tag 2000 may be attached to a vehicle, such as a car, a motorcycle, a bicycle, or the like. The NFC tag 2000 may also be located at a place, such as an entrance of a building, an entrance of a room in an office, or the like.

When the NFC tag 2000 is attached to a car, the NFC tag 2000 may be connected to a head unit (not shown) or a navigation device (not shown) of the car, wherein predetermined information generated by the head unit or the navigation device may be recorded in the NFC tag 2000. When the NFC tag 2000 is attached to an entrance of a building, the NFC tag 2000 may be connected to a device for managing the building in order to acquire predetermined information from the device for managing the building.

Figure 2:
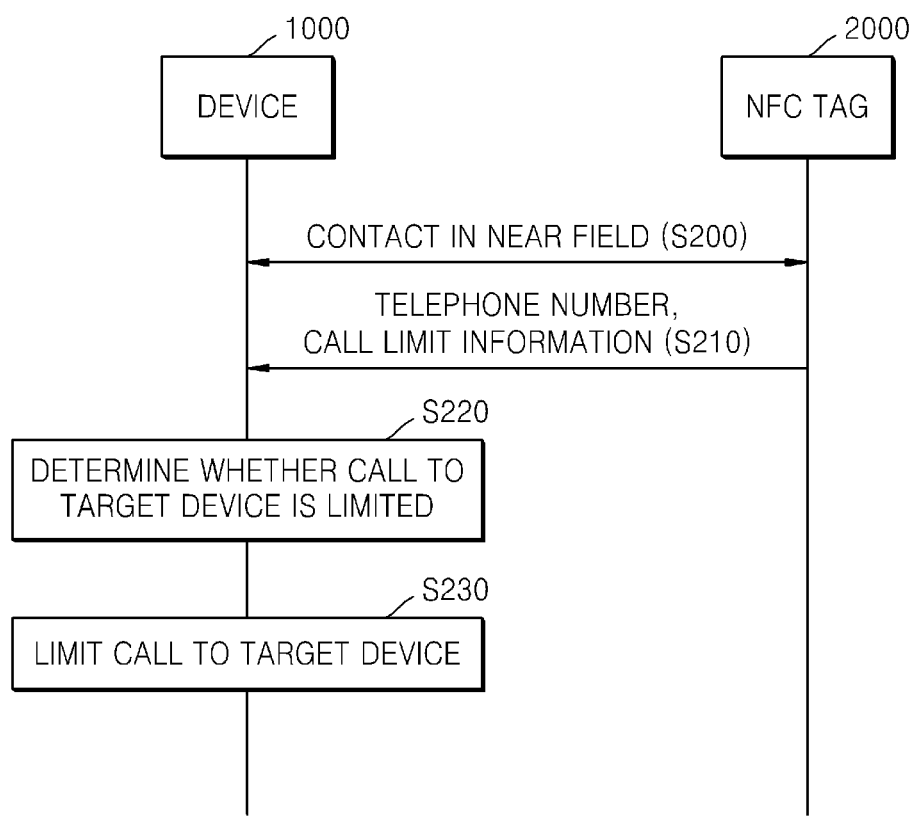
FIG. 2 is a signaling diagram which illustrates a method of limiting an outgoing call of a device by using private information and call limit information received by the device from an NFC tag, according to an exemplary embodiment.

FIG. 2 is a signaling diagram which illustrates a method of limiting an outgoing call of the device 1000 by using private information and call limit information received by the device 1000 from the NFC tag 2000, according to an exemplary embodiment.

As shown in FIG. 2, in operation S200, the device 1000 contacts the NFC tag 2000 within a near field. The device 1000 may approach within a predetermined range from the NFC tag 2000 and connect to communicate with the NFC tag 2000.

In operation S210, the device 1000 receives a telephone number and call limit information from the NFC tag 2000. The device 1000 may receive the telephone number of the target device 4000 and call limit information of the target device 4000 from the NFC tag 2000 according to an approach to and communication with the NFC tag 2000.

In this case, the telephone number and the call limit information of the target device 4000 may be stored in advance in the NFC tag 2000. When the user of the target device 4000 makes the target device 4000 approach the NFC tag 2000, the telephone number of the target device 4000 may be recorded in the NFC tag 2000. In addition, the user of the target device 4000 may input predetermined call limit information into the target device 4000, and when the user of the target device 4000 makes the target device 4000 approach the NFC tag 2000, the input call limit information may be recorded in the NFC tag 2000. However, the exemplary embodiments not limited thereto, and the user of the target device 4000 may record the telephone number and the call limit information of the target device 4000 in the NFC tag 2000 by using various devices; i.e., a head unit of a car, a navigation device of a car, a device for managing a building, and the like.

In operation S220, the device 1000 determines whether a call to the target device 4000 having the received telephone number is limited. The device 1000 may determine whether a call to the target device 4000 is limited, based on a call condition included in the call limit information.

The call limit information is information to be used in order to determine whether a call to the target device 4000 is limited and may include information regarding the call condition for a call to the target device 4000. The call condition may include, for example, at least one of a time condition, a position condition, and a count condition for making a call to the target device 4000.

A method of determining, by the device 1000, whether a call to the target device 4000 is limited will be described below in more detail with reference to FIGS. 3 to 5.

In operation S230, the device 1000 limits a call to the target device 4000. In response to a determination by device 1000 in operation S220 that a call to the target device 4000 is limited, in operation S230, the device 1000 limits a call to the target device 4000.

The device 1000 may block transmission of a call connection signal using the telephone number of the target device 4000. In addition, the device 1000 may not display the telephone number of the target device 4000 in a call log or in contact information. The device 1000 may delete the telephone number of the target device 4000 or may display the telephone number of the target device 4000 as "*--**".

Figure 3:
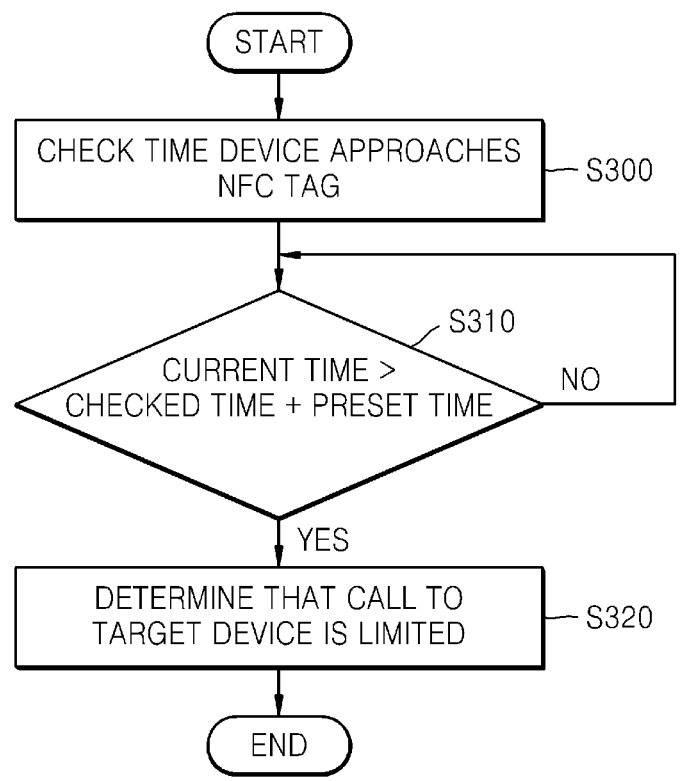
FIG. 3 is a flowchart which illustrates a method of determining, by the device, whether a call to a target device is limited, based on a time condition, according to an exemplary embodiment.

FIG. 3 is a flowchart which illustrates a method of determining, by the device 1000, whether a call to the target device 4000 is limited, based on a time condition, according to an exemplary embodiment.

As shown in FIG. 3, in operation S300, the device 1000 checks a time the device 1000 approaches the NFC tag 2000. The device 1000 may check that the device 1000 contacts the NFC tag 2000 in a near field and check a time the device 1000 contacts the NFC tag 2000 in a near field. For example, according to an approach of the device 1000 to the NFC tag 2000, the device 1000 may receive at least one of a telephone number and call limit information from the NFC tag 2000 and may check a time that at least one of the telephone number and the call limit information is received.

In operation S310, the device 1000 determines whether the current time is greater than a time obtained by adding a preset time to the time checked in operation S300.

The device 1000 may check a time condition included in the call limit information, acquire a predetermined time value included in the time condition, and add the time value acquired from the call limit information to the time checked in operation S300. For example, if the time condition included in the call limit information is a condition of "limiting a call if one hour has elapsed since a time the device 1000 approaches the NFC tag 2000", the device 1000 may calculate a value obtained by adding "one hour" to the time checked in operation S300. In addition, the device 1000 may compare the obtained value with the current time.

In response to a determination in operation S310 that the obtained value is greater than the current time, the device 1000 determines in operation S320 that a call to the target device 4000 is limited. Thus, the user of the target device 4000 may limit the device 1000 of another user who makes a call using the telephone number of the target device 4000, to only within a predetermined period of time from the time that the device 1000 of another user contacts the NFC tag 2000.

Figure 4:
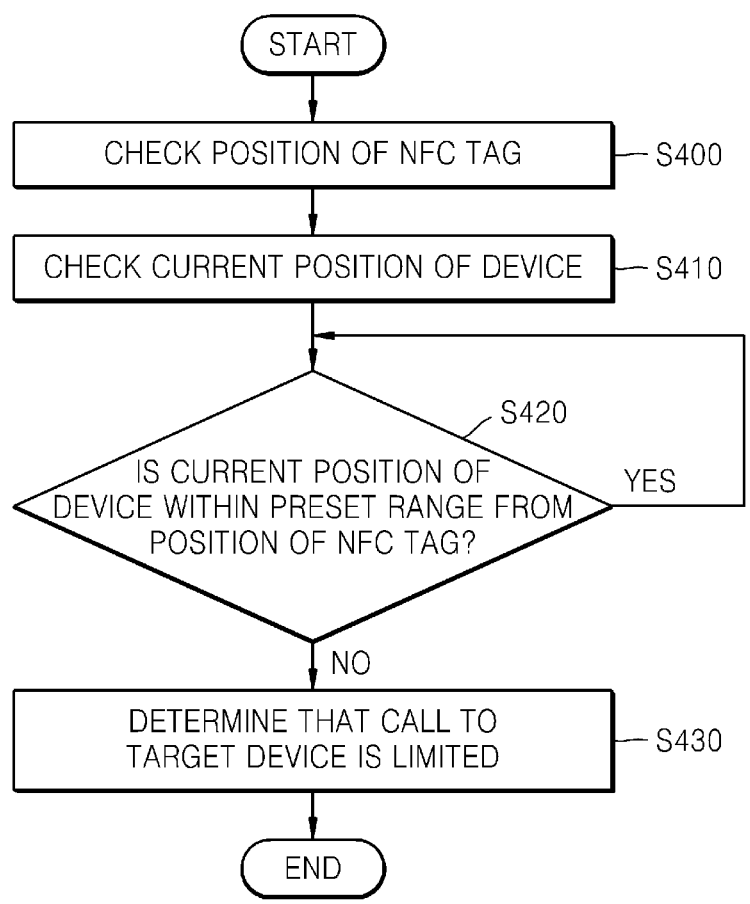
FIG. 4 is a flowchart which illustrates a method of determining, by the device, whether a call to the target device is limited, based on a position condition, according to an exemplary embodiment.

FIG. 4 is a flowchart which illustrates a method of determining, by the device 1000, whether a call to the target device 4000 is limited, based on a position condition, according to an exemplary embodiment.

As shown in FIG. 4, in operation S400, the device 1000 checks a position of the NFC tag 2000. The device 1000 may check that the device 1000 contacts the NFC tag 2000 in a near field and may check the position of the NFC tag 2000 by checking a position of the device 1000 when the device 1000 approaches the NFC tag 2000. For example, according to the device 1000 approaching the NFC tag 2000, the device 1000 may receive at least one of a telephone number and call limit information from the NFC tag 2000 and may check a position of the device 1000 when at least one of the telephone number and the call limit information is received.

When position information of the NFC tag 2000 is stored in the NFC tag 2000, the device 1000 may receive the position of the NFC tag 2000 from the NFC tag 2000 according the device 1000 approaching the NFC tag 2000. For example, when the NFC tag 2000 is connected to a navigation device (not shown) of a car, the NFC tag 2000 may receive from the navigation device a GPS value acquired by the navigation device. In this case, the NFC tag 2000 may transmit to the device 1000 the GPS value received from the navigation device.

In operation S410, the device 1000 checks a current position of the device 1000. The device 1000 may acquire a current position value in order to try a call using a received telephone number. For example, the device 1000 may acquire a GPS value by using a GPS sensor included in the device 1000, but the exemplary embodiments are not limited thereto.

In operation S420, the device 1000 determines whether the current position of the device 1000 is within a preset range from the position of the NFC tag 2000.

The device 1000 may check a position condition included in the call limit information, acquire a predetermined range value included in the position condition, and determine whether the current position is within the preset range from the position of the NFC tag 2000. For example, if the position condition included in the call limit information is a condition of "limiting a call in a case of exceeding a range of a radius of 100 m from the NFC tag 2000," the device 1000 may determine whether the device 1000 satisfies the position condition, based on the position of the NFC tag 2000, the current position of the device 1000, and "100 m."

In response to a determination in operation S420 that the current position of the device 1000 is not within the preset range, the device 1000 determines in operation S430 that a call to the target device 4000 is limited. Thus, the user of the target device 4000 may limit the user of another device 1000 to only making a call using the telephone number of the target device 4000 from a position that is within a predetermined range from the NFC tag 2000.

Figure 5:
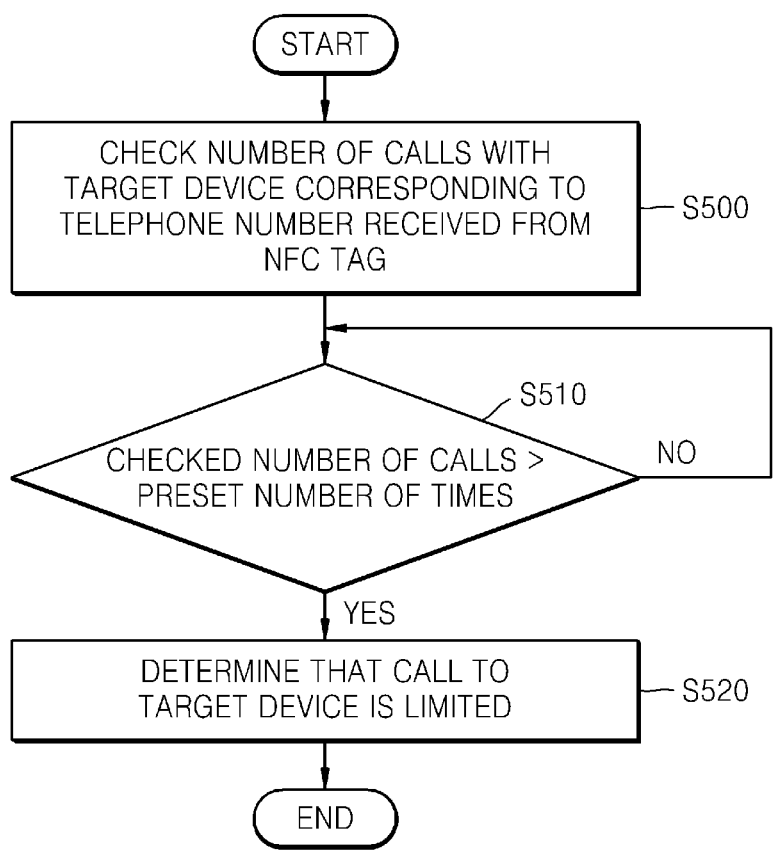
FIG. 5 is a flowchart which illustrates a method of determining, by the device, whether a call to the target device is limited, based on a call count condition, according to an exemplary embodiment.

FIG. 5 is a flowchart which illustrates a method of determining, by the device 1000, whether a call to the target device 4000 is limited, based on a call count condition, according to an exemplary embodiment.

As shown in FIG. 5, in operation S500, the device 1000 checks the number of calls with the target device 4000 which corresponds to a telephone number received from the NFC tag 2000.

In operation S510, the device 1000 determines whether the checked number of calls is greater than the preset number of calls. The device 1000 may check a call count condition included in call limit information, acquire a predetermined count value included in the call count condition, and determine whether the number of calls checked in operation S500 is greater than the count value acquired from the call limit information. For example, if the call count condition included in the call limit information is a condition of "limiting the number of calls not to be three or more," the device 1000 may determine whether the number of calls checked in operation S500 is equal to or greater than three.

In response to a determination in operation S510 that the checked number of calls is greater than the preset number of calls, the device 1000 determines in operation S520 that a call to the target device 4000 is limited. Thus, the user of the target device 4000 may limit a user of another device 1000 from making a call using the telephone number of the target device 4000 more than the preset number of calls.

FIGS. 6A and 6B illustrate a limitation of a call from the device 1000 to the target device 4000, according to an exemplary embodiment.

As shown in FIGS. 6A and 6B, the device 1000 may limit a call to the target device 4000 and may not display the telephone number of the target device 4000 in a call log. If the telephone number of the target device 4000 is "010-4321-7625," the device 1000 may display "010-4321-7625" in a call log as shown in FIG. 6A during the period of time that a call to the target device 4000 is available.

If the device 1000 limits a call to the target device 4000, the telephone number of the target device 4000 is not displayed in a call log, and "*--" may be displayed instead, as shown in FIG. 6B**.

However, the exemplary embodiments are not limited thereto, and the device 1000 may limit a call to the target device 4000 regardless of whether the telephone number of the target device 4000 is displayed in a call log. For example, even though the telephone number of the target device 4000 is not displayed in a call log, a call to the target device 4000 may be allowed. As another example, even though the telephone number of the target device 4000 is displayed in a call log, a call to the target device 4000 may be limited.

Figure 7:
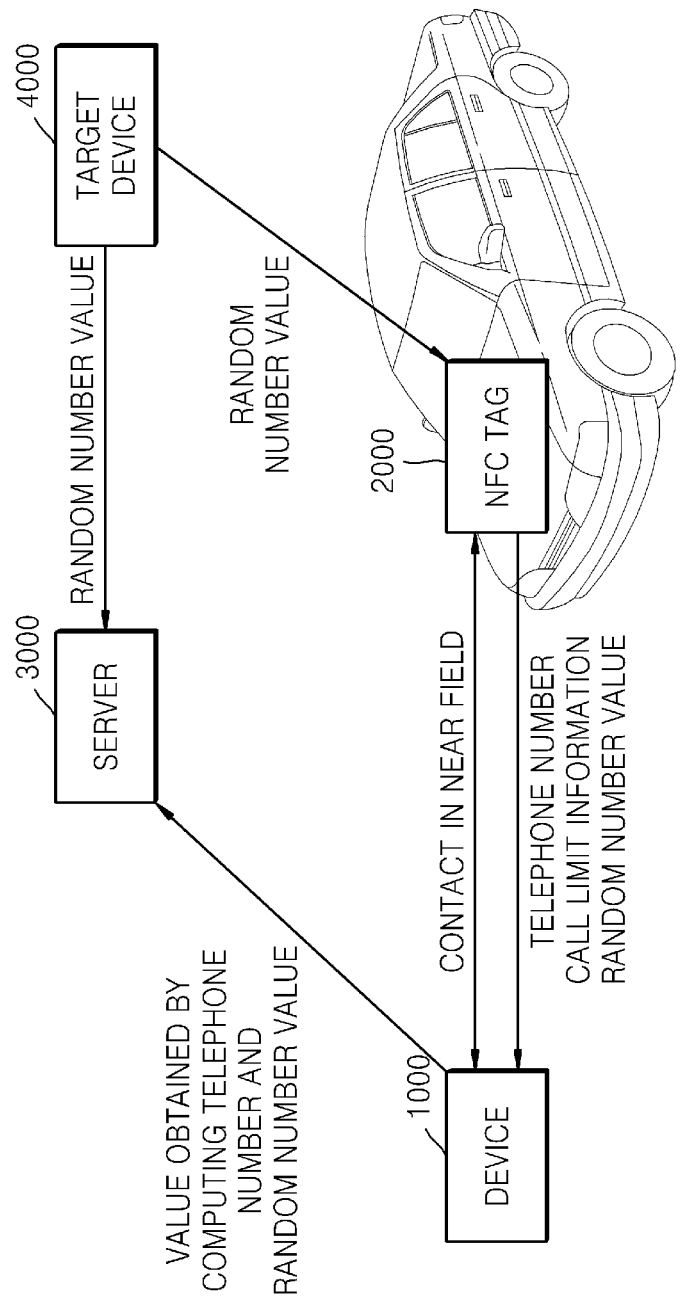
FIG. 7 is a block diagram of a system for protecting private information by using a random number value generated by the target device, according to an exemplary embodiment.

FIG. 7 is a block diagram of a system for protecting private information by using a random number value generated by the target device 4000, according to an exemplary embodiment.

As shown in FIG. 7, the system may not allow the telephone number of the target device 4000 to be exposed on the device 1000 by using a random number value generated by the target device 4000.

The target device 4000 may generate a random number value and provide the generated random number value to the NFC tag 2000 and the server 3000. The device 1000 may receive the telephone number of the target device 4000 and the random number value from the NFC tag 2000 according to an approach to the NFC tag 2000, and the device 1000 may compute the received telephone number and the received random number value and provide the computed value to the server 3000 in order to request that the server 3000 provide a call connection with the target device 4000. The server 3000 may acquire the telephone number of the target device 4000 from the computed value received from the device 1000 by using the random number value provided from the target device 4000 and connect the target device 4000 and the device 1000 by using the acquired telephone number.

Figure 8:
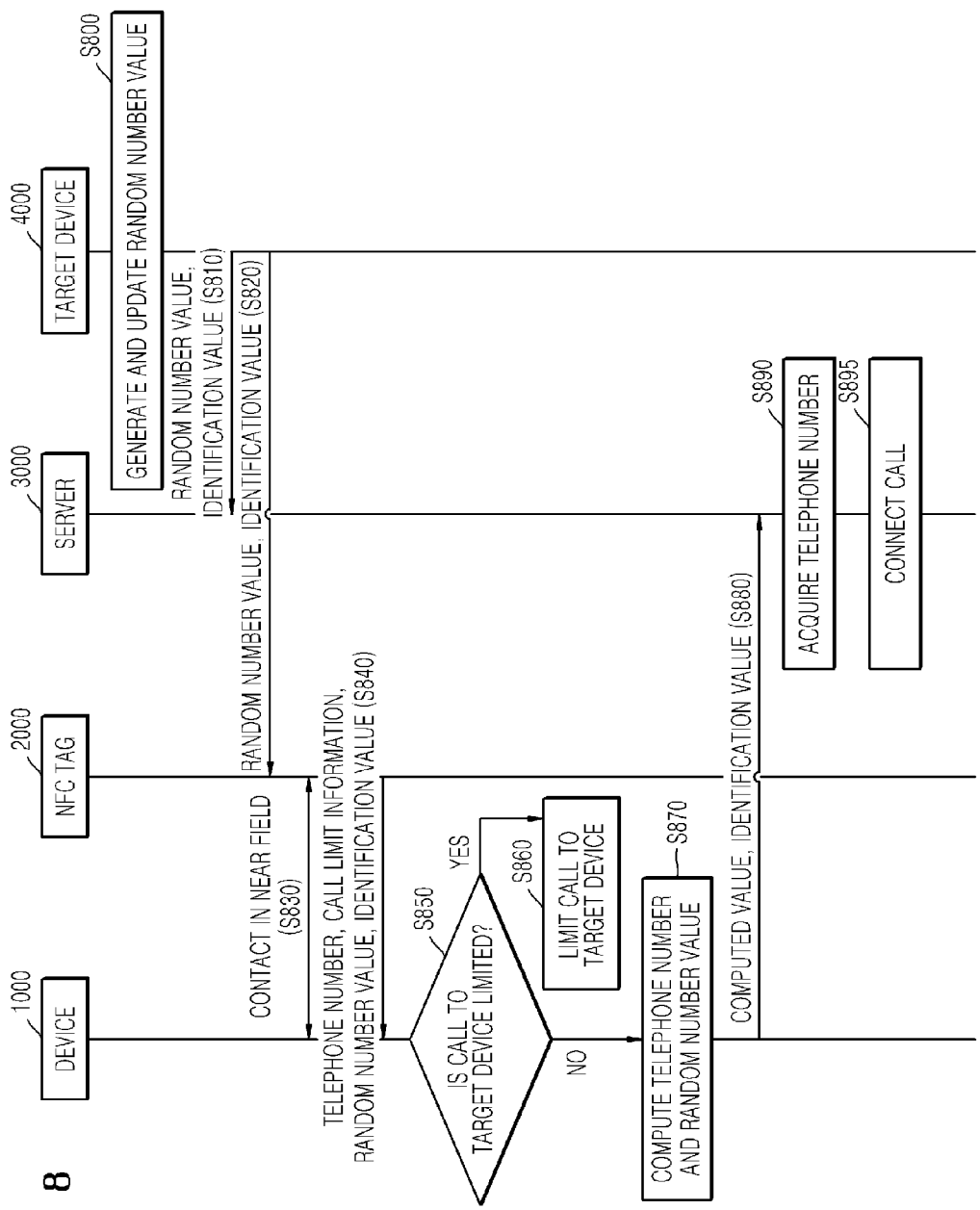
FIG. 8 is a signaling diagram illustrating a method of making, by the device, a call by using a random number value generated by the target device and a telephone number of the target device, according to an exemplary embodiment.

FIG. 8 is a signaling diagram which illustrates a method of making, by the device 1000, a call by using a random number value generated by the target device 4000 and the telephone number of the target device 4000, according to an exemplary embodiment.

As shown in FIG. 8, in operation S800, the target device 4000 generates and updates a random number value. When the user of the target device 4000 desires to provide the telephone number of the target device 4000 to the device 1000 via the NFC tag 2000, the user of the target device 4000 may generate and update a predetermined random number value by using the target device 4000. For example, when the target device 4000 approaches the NFC tag 2000, the target device 4000 may generate and update a random number value.

In operation S810, the target device 4000 provides an identification value of the target device 4000 and the generated random number value to the server 3000. The identification value of the target device 4000 may include at least one of, for example, a model name of the target device 4000, a user ID of the target device 4000, a model name of a vehicle to which the NFC tag 2000 of the user of the target device 4000 is attached, and a model name of the NFC tag 2000 of the user of the target device 4000, but the exemplary embodiments are not limited thereto. The identification value of the target device 4000 may be stored in advance in the target device 4000.

In operation S820, the target device 4000 provides the identification value of the target device 4000 and the generated random number value to the NFC tag 2000. When the target device 4000 approaches the NFC tag 2000, the target device 4000 may provide the identification value of the target device 4000 and the generated random number value to the NFC tag 2000 through NFC.

In operation S830, the device 1000 contacts the NFC tag 2000 in a near field. The device 1000 may approach within a predetermined range from the NFC tag 2000 and connect to communicate with the NFC tag 2000.

In operation S840, the NFC tag 2000 provides the telephone number of the target device 4000, call limit information, and the random number value to the device 1000. The device 1000 may receive the telephone number of the target device 4000, the call limit information, the random number value, and the identification value of the target device 4000 according to an approach to the NFC tag 2000.

The NFC tag 2000 may also provide to the device 1000 private information related to the user of the target device 4000, such as an email address, a homepage address, or the like. In this case, the private information related to the user of the target device 4000 may be stored in advance in the NFC tag 2000.

In operation S850, the device 1000 determines whether a call to the target device 4000 is limited. The device 1000 may determine whether a call to the target device 4000 is limited, based on the call limit information received from the NFC tag 2000. The call limit information may include at least one of, for example, a time condition, a position condition, and a call count condition for a call to the target device 4000, but is not limited thereto.

In response to a determination by device 1000, in operation S850 that a call to the target device 4000 is limited, the device 1000 limits a call to the target device 4000 in operation S860. The device 1000 may block transmission of a call connection signal using the telephone number of the target device 4000. In addition, the device 1000 may not display the telephone number of the target device 4000 in a call log or contact information.

In response to a determination by device 1000, in operation S850 that a call to the target device 4000 is not limited, the device 1000 computes the telephone number of the target device 4000 and the random number value in operation S870. For example, the device 1000 may add the telephone number of the target device 4000 to the random number value, but the exemplary embodiments are not limited thereto, and the device 1000 may compute the telephone number of the target device 4000 and the random number value according to various settings.

The device 1000 may display the computed value on the device 1000 so that the user of the device 1000 cannot recognize the telephone number of the target device 4000.

The device 1000 may compute the private information of the user of the target device 4000, such as an email address, a homepage address, or the like, with the random number value.

In operation S880, the device 1000 provides the computed value and the identification value of the target device 4000 to the server 3000. The device 1000 may provide the computed value and the identification value of the target device 4000 to the server 3000 to request the server 3000 connect a call with the target device 4000.

In operation S890, the server 3000 acquires the telephone number of the target device 4000 from the computed value received from the device 1000. The server 3000 may acquire a random number value which corresponds to the target device 4000 by using the identification value of the target device 4000 received from the device 1000. In addition, the server 3000 may confirm the telephone number of the target device 4000 from the computed value received from the device 1000 by using the acquired random number value.

The server 3000 may confirm the email address or the homepage address of the user of the target device 4000 from the computed value received from the device 1000 by using the acquired random number value.

In operation S895, the server 3000 connects a call between the device 1000 and the target device 4000. The server 3000 may allow the device 1000 and the target device 4000 to connect a call with each other by using the telephone number of the target device 4000 acquired in operation S890.

If the server 3000 confirms the email address or the homepage address of the user of the target device 4000 in operation S890, the server 3000 may allow the device 1000 to transmit a predetermined message to the confirmed email address or to access the confirmed homepage address.

Figure 9:
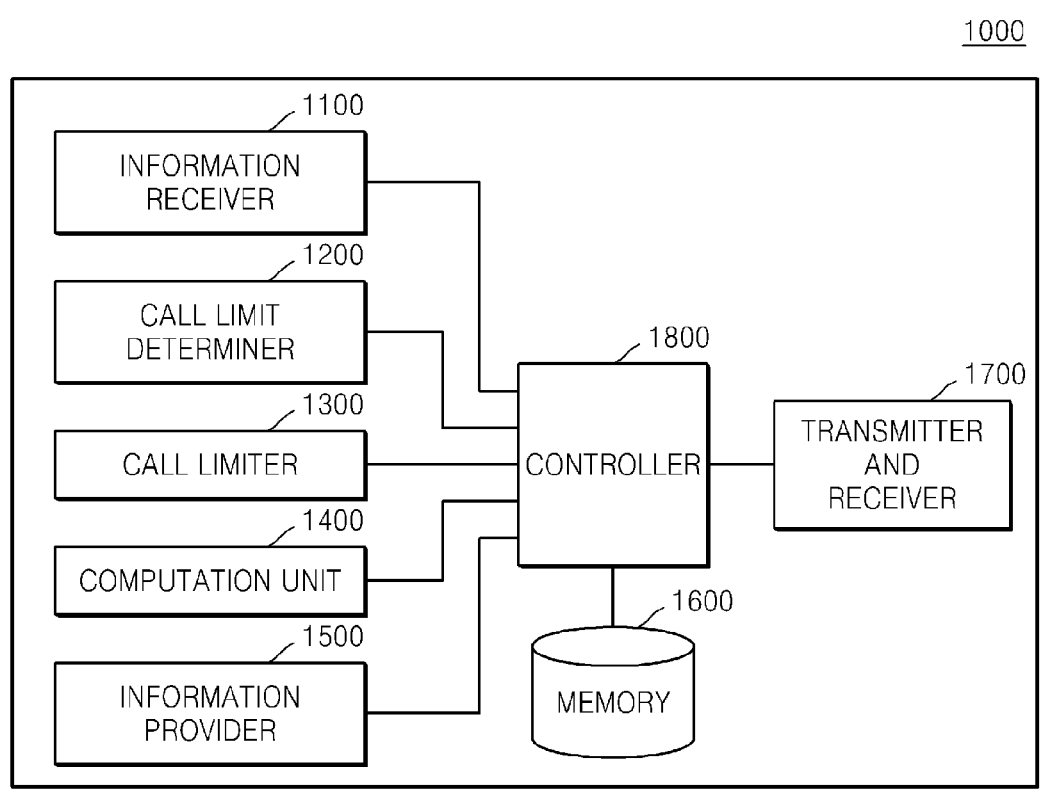
FIG. 9 is a block diagram of the device according to an exemplary embodiment.

FIG. 9 is a block diagram of the device 1000 according to an exemplary embodiment.

As shown in FIG. 9, the device 1000 may include an information receiver 1100, a call limit determiner 1200, a call limiter 1300, a computation unit 1400, an information provider 1500, a memory 1600, a transmitter and receiver 1700, and a controller 1800.

The information receiver 1100 receives the telephone number of the target device 4000, call limit information, the identification value of the target device 4000, and a random number value from the NFC tag 2000. According to an approach of the device 1000 to the NFC tag 2000, the information receiver 1100 may receive from the NFC tag 2000 the telephone number of the target device 4000, the call limit information, the identification value of the target device 4000, and the random number value.

The information receiver 1100 may receive from the NFC tag 2000 private information related to the user of the target device 4000, such as an email address, a homepage address, or the like. In this case, the private information of the user of the target device 4000 may be stored in advance in the NFC tag 2000.

The call limit determiner 1200 determines whether a call to the target device 4000 having the received telephone number is limited. The call limit determiner 1200 may determine whether a call to the target device 4000 is limited, based on a call condition included in the call limit information.

The call limit information is information to be used in order to determine whether a call to the target device 4000 is limited and may include information regarding the call condition for a call to the target device 4000. The call condition may include, for example, at least one of a time condition, a position condition, and a count condition for making a call to the target device 4000.

The call limit determiner 1200 may determine whether a call to the target device 4000 is limited, as described with reference to FIGS. 3 to 5.

The limiter 1300 limits a call to the target device 4000. The call limit unit 1300 may block transmission of a call connection signal using the telephone number of the target device 4000. In addition, the call limiter 1300 may not display the telephone number of the target device 4000 in a call log or contact information. The call limiter 1300 may delete the telephone number of the target device 4000 or may display the telephone number of the target device 4000 as "*--**."

The computation unit 1400 computes the telephone number of the target device 4000 and the random number value. In response to a determination by the call limit determiner 1200 that a call to the target device 4000 is not limited, the computation unit 1400 may compute the telephone number of the target device 4000 and the random number value.

For example, the computation unit 1400 may add the telephone number of the target device 4000 to the random number value, but the exemplary embodiments are not limited thereto. The computation unit 1400 may compute the telephone number of the target device 4000 and the random number value according to various settings. The device 1000 may display the value computed by the computation unit 1400 on the device 1000 so that the user of the device 1000 cannot recognize the telephone number of the target device 4000. The computation unit 1400 may compute the private information of the user of the target device 4000, such as an email address, a homepage address, or the like, with the random number value.

The information provider 1500 provides predetermined information to the server 3000 and requests the server 3000 for a call connection with the target device 4000. The information provider 1500 may provide the telephone number of the target device 4000 to the server 3000. The information provider 1500 may also provide the value computed by the computation unit 1400 and the identification value of the target device 4000 to the server 3000.

The memory 1600 stores various kinds of information so that the device 1000 can limit a call to the target device 4000 by using information received from the NFC tag 2000 or compute the telephone number of the target device 4000 and request the server 3000 for a call connection with the target device 4000.

The transmitter and receiver 1700 transmits and receives, to and from the server 3000 and the NFC tag 2000, the various kinds of information required for the device 1000 to limit a call to the target device 4000 by using information received from the NFC tag 2000 or compute the telephone number of the target device 4000 and request the server 3000 provide a call connection with the target device 4000.

The controller 1800 controls the general operation of the device 1000 and controls the information receiver 1100, the call limit determiner 1200, the call limiter 1300, the computation unit 1400, the information provider 1500, the memory 1600, and the transmitter and receiver 1700 so that the device 1000 can limit a call to the target device 4000 by using information received from the NFC tag 2000 or compute the telephone number of the target device 4000 and request the server 3000 provide a call connection with the target device 4000.

Some or all of the information receiver t 1100, the call limit determiner 1200, the call limiter 1300, the computation unit 1400, the information provider 1500, the transmitter and receiver 1700, and the controller 1800 may operate according to a software module, but the exemplary embodiments are not limited thereto. Some of the information receiver 1100, the call limit determiner 1200, the call limiter 1300, the computation unit 1400, the information provider 1500, the transmitter and receiver 1700, and the controller 1800 may operated through a hardware module.

At least some of the information receiver 1100, the call limit determiner 1200, the call limiter 1300, the computation unit 1400, the information provider 1500, and the transmitter and receiver 1700 may be included in the controller 1800, and the information receiver 1100, the call limit determiner 1200, the call limiter 1300, the computation unit 1400, the information provider 1500, the transmitter and receiver 1700, and the controller 1800 may operated by one processor. However, the exemplary embodiments are not limited thereto.

Figure 10:
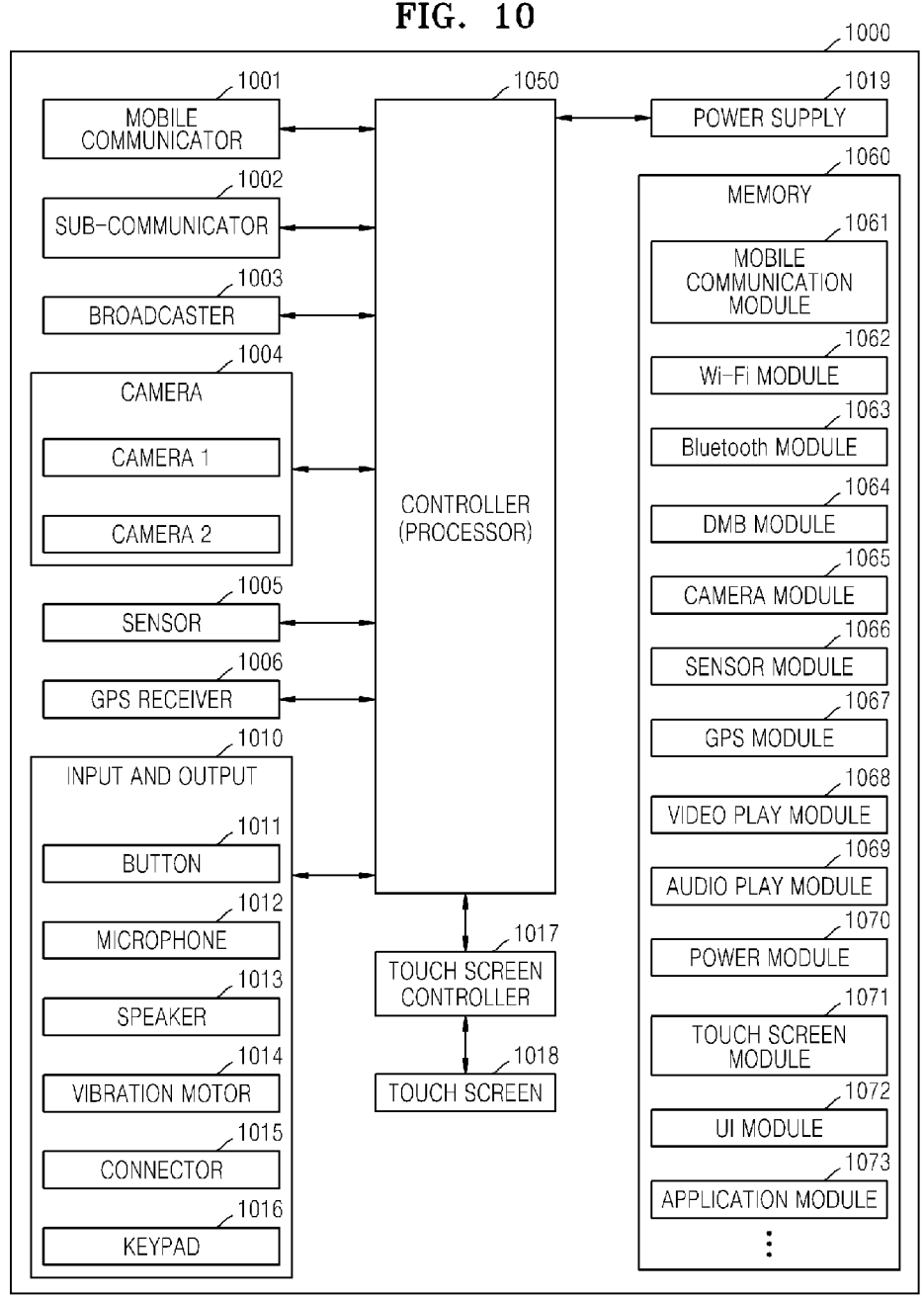
FIG. 10 is a block diagram of the device according to another exemplary embodiment.

FIG. 10 is a block diagram of the device 1000 according to another exemplary embodiment, wherein the device 1000 is a portable terminal device.

As shown in FIG. 10, a mobile communicator 1001 performs call establishment, data communication, and the like, with a base station through a cellular network, such as third-generation (3G) or 4G. A sub-communicator 1002 performs a function of short distance communication, such as Bluetooth®, NFC, or the like. A broadcaster 1003 receives a digital multimedia broadcasting (DMB) signal.

A camera 1004 includes a lens and optical devices for capturing an image or a video.

A sensor 1005 may include a gravity sensor for sensing a motion of the device 1000, an illumination sensor for sensing the brightness of light, a proximity sensor for sensing an approach of the human being, a motion sensor for sensing a motion of the human being, and the like.

A GPS receiver 1006 receives a GPS signal from artificial satellites. Various services may be provided to a user by using the GPS signal.

An input and output 1010 provides interfaces with an external device or the human being and includes a button 1011, a microphone 1012, a speaker 1013, a vibration motor 1014, a connector 1015 and a keypad 1016.

A touch screen 1018 receives a touch input from the user. A touch screen controller 1017 delivers the touch input inputted through the touch screen 1018 to a controller 1050. A power supply 1019 is connected to a battery or an external power source to supply power required for the device 1000.

The controller 1050 may limit a call to the target device 4000 or may compute the telephone number of the target device 4000 and request the server 3000 perform a call connection with the target device 4000, according to the exemplary embodiments by executing programs stored in a memory 1060.

The programs stored in the memory 1060 may be classified as a plurality of modules according to functions thereof, for example, classified into a mobile communication module 1061, a Wi-Fi module 1062, a Bluetooth® module 1063, a DMB module 1064, a camera module 1065, a sensor module 1066, a GPS module 1067, a video play module 1068, an audio play module 1069, a power module 1070, a touch screen module 1071, a user interface (UI) module 1072, an application module 1073, and the like.

Since a function of each module will be intuitively understood by one of ordinary skill in the art from a name thereof, only the application module 1073 will now be described.

The application module 1073 may receive the telephone number of the target device 4000, call limit information, the identification value of the target device 4000, and a random number value from the NFC tag 2000 via the sub-communicator 1002. The application module 1073 may receive from the NFC tag 2000 private information of the user of the target device 4000, such as an email address, a homepage address, or the like.

The application module 1073 may determine whether a call to the target device 4000 having the received telephone number is limited. The application module 1073 may determine whether a call to the target device 4000 is limited, based on a call condition included in the call limit information.

The application module 1073 may limit a call to the target device 4000. The application module 1073 may block transmission of a call connection signal using the telephone number of the target device 4000. In addition, the application module 1073 may not display the telephone number of the target device 4000 in a call log or in a contact information log.

The application module 1073 may compute the telephone number of the target device 4000 and the random number value. For example, the application module 1073 may add the telephone number of the target device 4000 to the random number value, but the exemplary embodiments are not limited thereto.

The application module 1073 may provide predetermined information to the server 3000 and may request that the server 3000 provide a call connection with the target device 4000. The application module 1073 may provide the server 3000 with the telephone number of the target device 4000. The application module 1073 may also provide the server 3000 with the computed value and the identification value of the target device 4000 to.

The device 1000 may download the application module 1073 from a separate server (not shown) and install the application module 1073 therein. For example, when the device 1000 approaches the NFC tag 2000, the device 1000 may receive link information (e.g., a link address) for downloading a program which corresponds to the application module 1073 from the NFC tag 2000 and may download the program which corresponds to the application module 1073 from the separate server by using the received link information.

Figure 11:
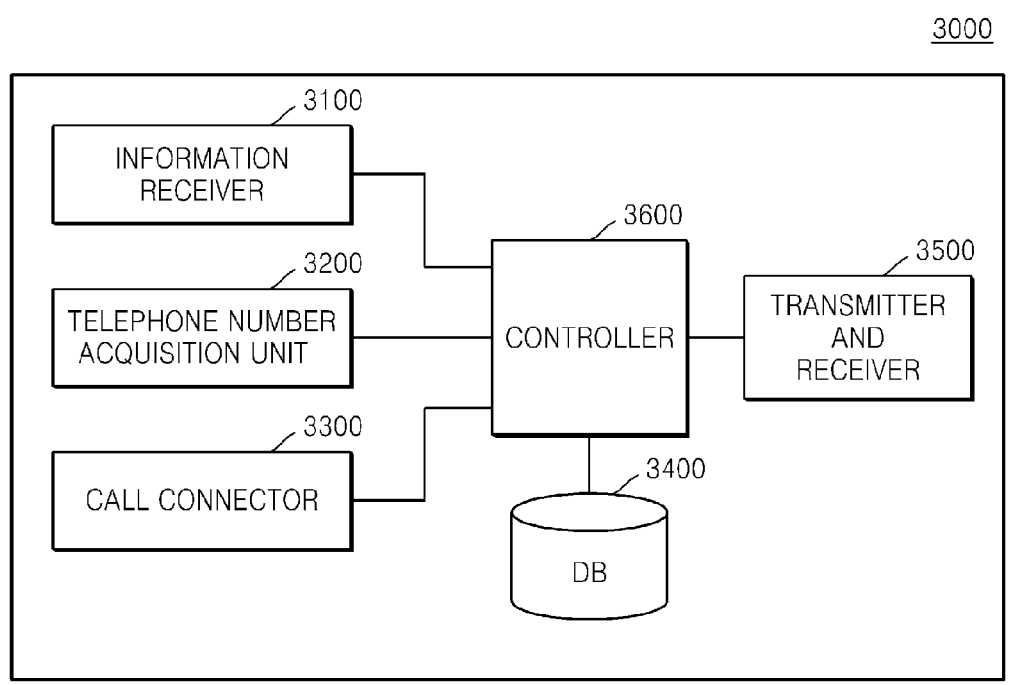
FIG. 11 is a block diagram of a server according to an exemplary embodiment.

FIG. 11 is a block diagram of the server 3000 according to an exemplary embodiment.

As shown in FIG. 11, the server 3000 may include an information receiver 3100, a telephone number acquirer 3200, a call connector 3300, a database (DB) 3400, a transmitter and receiver 3500, and a controller 3600.

The information receiver 3100 receives the identification value of the target device 4000 and a random number value generated by the target device 4000 from the target device 4000. The identification value of the target device 4000 may include at least one of, for example, a model name of the target device 4000, a user ID of the target device 4000, a model name of a vehicle to which the NFC tag 2000 of the user of the target device 4000 is attached, and a model name of the NFC tag 2000 of the user of the target device 4000, but the exemplary embodiments are not limited thereto.

The information receiver 3100 may also receive the telephone number of the target device 4000 from the device 1000. The information receiver 3100 may also receive a value obtained by computing the telephone number of the target device 4000 and the random number value from the device 1000.

The telephone number acquirer 3200 acquires a telephone number from the computed value received from the device 1000. The telephone number acquirer 3200 may acquire the telephone number from the computed value received from the device 1000 by using the random number value which corresponds to the identification value of the target device 4000, which is received from the device 1000.

The call connector 3300 may allow the device 1000 to call the target device 4000 by using the telephone number of the target device 4000.

The DB 3400 stores various kinds of information required for the server 3000 to allow the device 1000 to call the target device 4000.

The transmitter and receiver 3500 controls the general operation of the server 3000 and controls the information receiver 3100, the telephone number acquirer 3200, the call connector 3300, the DB 3400, and the transmitter and receiver 3500 so that the server 3000 can allow the device 1000 to call the target device 4000.

One exemplary embodiment may be implemented even in a form of recording medium including instructions executable by a computer, such as program modules executed by a computer. A computer-readable storage medium may be an arbitrary available medium that is accessible by a computer and includes all of volatile and nonvolatile media and separated and non-separated media. In addition, the computer-readable storage medium may include both a computer readable storage medium and a communication medium. The computer-readable storage medium includes all of volatile, nonvolatile, separated, and non-separated media implemented in an arbitrary method or technique for storing information, such as computer-readable instructions, a data structure, a program module, and other data. The communication medium typically includes computer-readable instructions, a data structure, a program module, other data of a modulated data signal, such as a carrier, and other transmission mechanisms and includes an arbitrary information transfer medium.

The exemplary embodiments which have been described are only illustrative, and it will be understood by one of ordinary skill in the art that various changes in form and details may be made therein without changing the technical spirit and mandatory features of the exemplary embodiments. Therefore, the exemplary embodiments should be understood in the illustrative sense only and not for the purpose of limitation in all aspects. For example, each component described in a singular type may be carried out in a distributed fashion, and components described in a distributed fashion may be carried out in a combination form as well.

In addition, other exemplary embodiments can also be implemented through computer readable code/instructions in/on a storage medium, e.g., a computer readable medium, in order to control at least one processing element to implement any above described exemplary embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bit-stream according to one or more exemplary embodiments. The media may also be a distributed network, so that the computer readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. A method of making a call by using a telephone number received from a near field communication (NFC) tag, the method performed by a device and comprising:
    approaching, by the device, the NFC tag;
    receiving from the NFC tag a telephone number together with call limit information related to the telephone number based on the approaching of the device to the NFC tag;
    determining whether a call to a target device having the received telephone number is limited, based on the received call limit information; and
    limiting a call to the target device based on the determination.

2. The method of claim 1, wherein the call limit information includes information related to a position condition for a call to the target device,
    the method further comprises checking a position of the device based on the approaching of the device to the NFC tag, and
    the determining comprises determining whether a call to the target device is limited, based on the information related to the position condition and the checked position of the device.

3. The method of claim 1, wherein the call limit information includes information related to a count condition for a call to the target device,
    the method further comprises checking the number of times the device was call-connected to the target device, and
    the determining comprises determining whether a call to the target device is limited, based on the information related to the count condition and the checked number of times.

4. The method of claim 1, wherein the limiting comprises blocking transmission of a call connection signal from the device to the telephone number of the target device.

5. The method of claim 1, wherein the limiting comprises deleting the telephone number from a call log.

6. The method of claim 1, further comprising transmitting a call connection signal to the target device in response to a call to the target device not being limited.

7. A non-transitory computer-readable storage medium having stored therein program instructions, which when executed by a processor of a computer, cause the computer to perform the method of claim 1.

8. The method of claim 1, wherein the NFC tag is placed on an entity remote from the target device and wherein the limiting comprises executing, by the device, the call to the target device without displaying the received telephone number in a call log of the device.

9. The method of claim 1, further comprising: transmitting a call request to the target device based on the telephone number and deleting the received telephone number of the target device from a call log after a predetermined period of time based on the received call limitation information.

10. A method of making a call by using a telephone number received from a near field communication (NFC) tag, the method performed by a device and comprising:
    receiving from the NFC tag a telephone number and call limit information related to the telephone number according to an approach to the NFC tag;
    determining whether a call to a target device having the received telephone number is limited, based on the call limit information; and
    limiting a call to the target device based on the determination,
    wherein the call limit information includes information related to a time condition for a call to the target device, and
    the determining comprises determining whether a call to the target device is limited, based on whether a predetermined period of time has elapsed from a time the device approached the NFC tag.

11. A method of making a call by using a telephone number received from a near field communication (NFC) tag, the method performed by a device and comprising:
    receiving from the NFC tag a telephone number and call limit information related to the telephone number according to an approach to the NFC tag;
    determining whether a call to a target device having the received telephone number is limited, based on the call limit information;
    limiting a call to the target device based on the determination;
    transmitting a call connection signal to the target device in response to a call to the target device not being limited; and
    receiving a random number value from the NFC tag according to the approach to the NFC tag,
    wherein the transmitting comprises transmitting to a server a value obtained by computing the telephone number and the random number value.

12. The method of claim 11, wherein the random number value is generated by the target device and provided to the NFC tag and the server.

13. The method of claim 11, wherein the random number value is updated by the target device, and
    the updated random number value is provided from the target device to the NFC tag and the server.

14. The method of claim 11, further comprising receiving a predetermined identification value which corresponds to the telephone number according to the approach of the device to the NFC tag,
    wherein the transmitting comprises transmitting the identification value to the server, and
    the telephone number is confirmed by the server based on the computed value and the identification value.

15. A portable terminal device comprising:
a memory configured to store at least one program; and
a processor configured to make a call using a telephone number received from a near field communication (NFC) tag by executing the at least one program,
wherein the at least one program is configured to include instructions for executing:
receiving from the NFC tag the telephone number together with call limit information related to the telephone number in response to the portable terminal approaching to the NFC tag;
determining whether a call to a target device having the received telephone number is limited, based on the received call limit information; and
limiting a call to the target device based on the determination.

16. The portable terminal device of claim 15, wherein the call limit information includes information related to a position condition for a call to the target device,
the at least one program further includes instructions for executing checking a position of the portable terminal device, in response to the portable terminal device approaching to the NFC tag, and
the determining comprises determining whether a call to the target device is limited, based on the information related to the position condition and the checked position of the portable terminal device.

17. The portable terminal device of claim 15, wherein the call limit information includes information related to a count condition for a call to the target device,
the at least one program further includes executable instructions configured to check the number of times the portable terminal device was call-connected to the target device, and
the determining comprises determining whether a call to the target device is limited, based on the information related to the count condition and the checked number of calls to the target device.

18. The portable terminal device of claim 15, wherein the limiting comprises blocking transmission of a call connection signal from the portable terminal device to the target device.

19. The portable terminal device of claim 15, wherein the limiting comprises deleting the telephone number from a call log.

20. The portable terminal device of claim 15, wherein the at least one program further includes executable instructions configured to transmit a call connection signal to the target device in response to a call to the target device not being limited.

21. A portable terminal device comprising:
a memory configured to store at least one program; and
a processor configured to make a call sing a telephone number received from a near field communication (NFC) tag by executing the at least one program,
wherein the at least one program is configured to include instructions for executing:
receiving from the NFC tag the telephone number and call limit information related to the telephone number according to an approach to the NFC tag;
determining whether a call to a target device having the received telephone number is limited, based on the call limit information; and
limiting a call to the target device based on the determination,
wherein the call limit information includes information related to a time condition for a call to the target device, and
wherein the determining comprises determining whether a call to the target device is limited, based on whether a predetermined period of time has elapsed from a time the portable terminal device approached the NFC tag.

22. A portable terminal device comprising:
a memory configured to store at least one program; and
a processor configured to make a call using a telephone number received from a near field communication (NFC) tag by executing the at least one program,
wherein the at least one program is configured to include instructions for executing:
receiving from the NFC tag the telephone number and call limit information related to the telephone number according to an approach to the NFC tag;
determining whether a call to a target device having the received telephone number is limited, based on the call limit information;
limiting a call to the target device based on the determination;
transmitting a call connection signal to the target device in response to a call to the target device not being limited; and
receiving a random number value from the NFC tag according to the approach to the NFC tag,
wherein the transmitting comprises transmitting to a server a value obtained by computing the telephone number and the random number value.

23. The portable terminal device of claim 22, wherein the random number value is generated by the target device and provided to the NFC tag and the server.

24. The portable terminal device of claim 22, wherein the random number value is updated by the target device, and
the updated random number value is provided from the target device to the NFC tag and the server.

25. The portable terminal device of claim 22, wherein the at least one program further includes executable instructions configured to receive a predetermined identification value which corresponds to the telephone number according to the approach of the portable terminal device to the NFC tag,
wherein the transmitting comprises transmitting the identification value to the server, and
the telephone number is confirmed by the server based on the computed value and the identification value.

26. A system for making a call by using a telephone number and call limiting information received from a near field communication (NFC) tag, the system comprising:
a device configured to communicate with the NFC tag; and
a target device configured to provide the NFC tag with the telephone number and call limit information related to the target device;
wherein, in response to the device establishing communication with the NFC tag, the device is configured to receive the telephone number together with call limit information and determine whether a call to the target device is limited based on the received call limit information.

27. The system for making a call by using a telephone number received from a near field communication (NFC) tag of claim 26, further comprising a server located between the device and the target device.

28. The system for making a call by using a telephone number received from a near field communication (NFC) tag of claim 26, wherein the device limits a call to the target device based on the determination that the call is limited.

29. The system for making a call by using a telephone number received from a near field communication (NFC) tag of claim 26, wherein the call limit information includes a current time.

30. The system for making a call by using a telephone number received from a near field communication (NFC) tag of claim 26, wherein the call limit information includes whether the device is within a preset range of the NFC tag.

31. A system for making a call by using a telephone number and call limiting information received from a near field communication (NFC) tag, the system comprising:
- a device configured o be in communication with the NFC tag;
- a server: and
- a target device configured to provide the NFC tag with the telephone number and call limit information related to the target device;

wherein, in response to the device coming in communication with the NFC tag, the device is configured to receive the telephone number and call limit information and determine whether a call to the target device is limited, and wherein the server is configured to receive a random number value from the NFC tag according to an approach to the NFC tag by the device.

32. The system for making a call by using a telephone number received from a near field communication (NFC) tag of claim 31, wherein the target device transmits the random number to the NFC tag.

33. The system for making a call by using a telephone number received from a near field communication (NFC) tag of claim 31, wherein the target device updates the random number.

* * * * *